United States Patent
Meunier

(10) Patent No.: US 8,768,061 B2
(45) Date of Patent: Jul. 1, 2014

(54) POST OPTICAL CHARACTER RECOGNITION DETERMINATION OF FONT SIZE

(75) Inventor: Jean-Luc Meunier, St. Nazaire les Eymes (FR)

(73) Assignee: Xerox Corporation, Norwalk, CT (US)

( * ) Notice: Subject to any disclaimer, the term of this patent is extended or adjusted under 35 U.S.C. 154(b) by 261 days.

(21) Appl. No.: 13/462,053

(22) Filed: May 2, 2012

(65) Prior Publication Data

US 2013/0294695 A1 Nov. 7, 2013

(51) Int. Cl.
*G06K 9/18* (2006.01)

(52) U.S. Cl.
USPC .............................. 382/182; 382/229; 382/224

(58) Field of Classification Search
CPC ......................... G06K 9/00442; G06K 9/3233
USPC ........................................ 382/182, 229, 224
See application file for complete search history.

(56) References Cited

U.S. PATENT DOCUMENTS

| | | | | |
|---|---|---|---|---|
| 5,689,585 A | * | 11/1997 | Bloomberg et al. | .......... 382/229 |
| 5,825,919 A | | 10/1998 | Bloomberg et al. | |
| 5,883,974 A | * | 3/1999 | Fan et al. | ....................... 382/203 |
| 6,741,745 B2 | | 5/2004 | Dance et al. | |

* cited by examiner

*Primary Examiner* — Mike Rahmjoo
(74) *Attorney, Agent, or Firm* — Fay Sharpe LLP

(57) ABSTRACT

A method and system are disclosed for post optical character recognition font size determination. Optical character recognition output from an optical character recognition engine that includes character and bounding box information is aggregated into character strings. Measurements are then collected from each character in each character string that correspond to alignment heights of the top or bottom of the character with an ascender-line, a cap-line, a digit-line, a mean-line, a base-line, or a descender-line. Histograms are formed for each of these heights for each character string from the collected measurements. Based on the histograms, a pivot height is selected and used to determine the relative font size of the character string. The relative font size is normalized using a preselected factor associated with the selected pivot height. The normalized font size is then output as the font size of characters in the optical character recognition output.

19 Claims, 8 Drawing Sheets

400

SCENE V. Alexandria. CLEOPATRA's palace.
    Enter CLEOPATRA, CHARMIAN, IRAS, and ALEXAS
CLEOPATRA
    Give me some music; music, moody food
    Of us that trade in love. ← 402
Attendants
    The music, ho!
    Enter MARDIAN
CLEOPATRA
    Let it alone; let's to billiards: come, Charmian. ← 402
CHARMIAN
    My arm is sore; best play with Mardian.
CLEOPATRA
    As well a woman with an eunuch play'd
    As with a woman. Come, you'll play with me, sir?
MARDIAN
    As well as I can, madam.

|cleopatra|

502

|SCENE V. Alexandria. CLEOPATRA's |palace.|
|Enter CLEOPATRA, CHARMIAN, IRAS, and ALEXAS|
|CLEOPATRA|
|Give me some music; music,| moody |food| ←—506
|Of us that trade in love.|
|Attendants|
|The music, ho!|
|Enter MARDIAN|
|CLEOPATRA|
|Let it alone; let's to billiards. come, Charmian.|
|CHARMIAN|
|My arm is sore; best play with Mardian.| ←—506
|CLEOPATRA|
|As well a woman with an eunuch play'd|
|As with a woman. Come, |you'll| play with me, sir?|
|MARDIAN|
|As well as I can, madam.|

POST OPTICAL CHARACTER RECOGNITION DETERMINATION OF FONT SIZE

BACKGROUND

The following relates to the image processing arts, optical character recognition, and so forth.

Optical Character Recognition software, commonly referenced as "OCR," recognizes the glyphs in an image and output corresponding machine-encoded characters. More sophisticated OCR software aims to recognize the font type and font size, but many versions of OCR software do not. In addition, some available OCR systems combine several different versions of OCR software so as to increase the recognition rate, but these systems fail to produce the font size information. In general, font size information provides additional benefits to the OCR process, e.g., improved visualization, information extraction, and the like. For example, font size information can be important in subsequent processing, for instance when forming paragraphs or labeling text fragments as a title, caption, or the like.

For applications that require font size information, this places additional constraints on the selection of a suitable OCR solution, which can filter out several convenient and often inexpensive OCR solutions. For example, an inexpensive OCR solution may produce highly accurate transcriptions for Latin characters, but fails to produce the font size information. That is, suitable OCR solutions may output the character (Unicode) corresponding to the text, the relative position of the text (x, y) on the page, and its geometry (height, width), but not its font size or font type. Unfortunately, there is a lack of suitable fast and robust methods for computing the body size of text output during OCR operations.

INCORPORATION BY REFERENCE

The following references, the disclosures of which are incorporated herein by reference in their entireties, are mentioned:

Christopher R. Dance, et al., U.S. Pat. No. 6,741,745, issued May 25, 2004, entitled METHOD AND APPARATUS FOR FORMATTING OCR TEXT, discloses a method for identifying a font typeface and size using a word bounding box, observed on the image. The method proposes to render the optical character recognized text according to different typefaces (fonts) so as to match at best the observed bounding box, in the context of the selection of some word by an associated user.

Zhigang Fan et al., U.S. Pat. No. 5,883,974, issued Mar. 16, 1999, entitled METHODS FOR DETERMINING FONT ATTRIBUTES OF CHARACTERS, discloses a method for determining an estimate of a font attribute of a group of characters of an input image independently of any character identification information of the group.

BRIEF DESCRIPTION

In one aspect of the exemplary embodiment, a method for post optical character recognition ("OCR") font size determination that includes with a processor aggregating OCR output from an associated OCR engine into character strings, the OCR output comprising character code information and bounding box information. The method also includes collecting measurements from each of the plurality of character strings, and generating at least one histogram for each character string in accordance with collected measurements. Additionally, the method includes selecting a pivot height in accordance with the at least one generated histogram for each of the plurality of character strings, and determining a height for each character string of the plurality thereof in accordance with the selected pivot height. The method further includes normalizing the determined height by a preselected factor associated with the selected pivot height for each of the character strings, and determining a font size for the optical character recognition output based in accordance with the normalized height.

In another aspect, a post optical character recognition ("OCR") font size determination system includes a processor with access to associated memory. The associated memory stores OCR output from an associated OCR engine, the OCR output comprising character code and bounding box information. The system also includes an aggregator with access to the associated memory that aggregates the OCR output into a plurality of character strings. The system further includes memory in communication with the processor, which stores instructions which are executed by the processor for collecting measurements from each of the plurality of character strings, the measurements corresponding to a number of observations of heights associated with each character in each character string, wherein the heights correspond to an alignment of the bounding box of each character in each character string with an ascender-line, a cap-line, a digit-line, a mean-line, a base-line, or a descender-line. The memory also stores instructions for generating histograms for each character string in accordance with collected measurements for each of the ascender-line, the cap-line, the digit-line, the mean-line, the base-line, and the descender-line, and for selecting a pivot height in accordance with at least one generated histogram for each of the plurality of character strings, the pivot height corresponding to a height of the ascender-line, the cap-line, the digit-line, the mean-line, the base-line, or the descender-line. In addition, the memory stores instructions for determining a height for each of the character strings based upon the selected pivot height, and for normalizing the determined height for each of the character strings by a preselected factor that is associated with the selected pivot height. Furthermore, the memory stores instructions for determining a font size for the OCR output based in accordance with the normalized height.

In another aspect, a method for post optical character recognition ("OCR") font size determination includes receiving OCR output into associated memory from an associated OCR engine. The OCR output includes a character code and a bounding box corresponding to each character in an input image. The method also includes analyzing, with a processor in communication with the associated memory, a horizontal and a vertical displacement between the bounding boxes of consecutive characters relative to at least one dimension of each respective bounding box, and forming a plurality of character strings from the received OCR output in accordance with the bounding box analysis. The method further includes collecting measurements from each of the plurality of character strings, which measurements corresponds to the number of observations of heights associated with each character in each character string. The heights correspond to an alignment of the bounding box of each character with at least one of an ascender-line, a cap-line, a digit-line, a mean-line, a base-line, or a descender-line. Additionally, the method includes generating a histogram for each of the ascender-line, the cap-line, the digit-line, the mean-line, the base-line, and the descender-line for each of the plurality of character strings in accordance with the collected measurements, and selecting a pivot height in accordance with the at least one generated histogram for each of the plurality of character strings. The pivot height corresponds to a height of the ascender-line, the cap-line, the digit-line, the mean-line, the base-line, or the descender-line. The method also includes determining a height for each of the character strings in accordance with the selected pivot height, and normalizing the determined height by a preselected factor that is associated with the selected pivot height for each of the character strings. The method further includes outputting a font size associated with each of the plurality of character strings based in part upon the normalized height in association with the received OCR output.

BRIEF DESCRIPTION OF THE DRAWINGS

FIG. 4 shows an example input image containing text that is subject to optical character recognition in accordance with one embodiment.

FIG. 5 illustrates an example output of optical character recognition text based upon the image of FIG. 4.

DETAILED DESCRIPTION

Figure 1A:
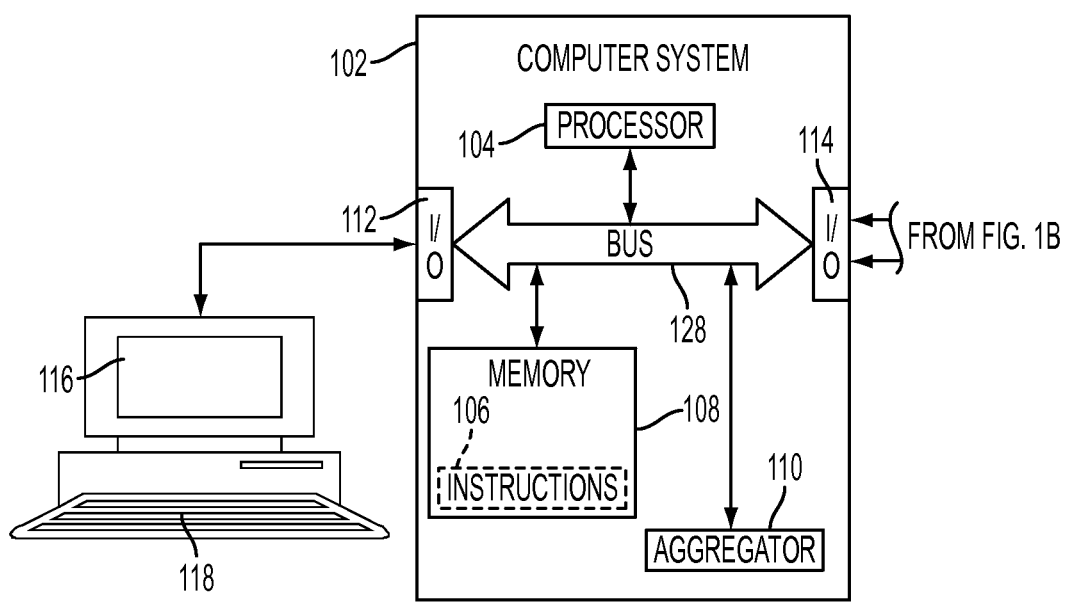
FIGS. 1A-1B diagrammatically shows a system for post optical character recognition font size determination.

One or more implementations will now be described with reference to the drawings, wherein like reference numerals are used to refer to like elements throughout. Aspects of exemplary embodiments relate to systems and methods for determining the font size of the characters in a document after those characters have been recognized by an optical character recognition ("OCR") engine.

The embodiments set forth enable the computation of the font size of characters from an image of a page, where OCR output includes an identification of the character (Unicode code), and the bounding box information (i.e., the character's position (x, y) on a page, and the character's geometry (height, width)).

Figure 1B:
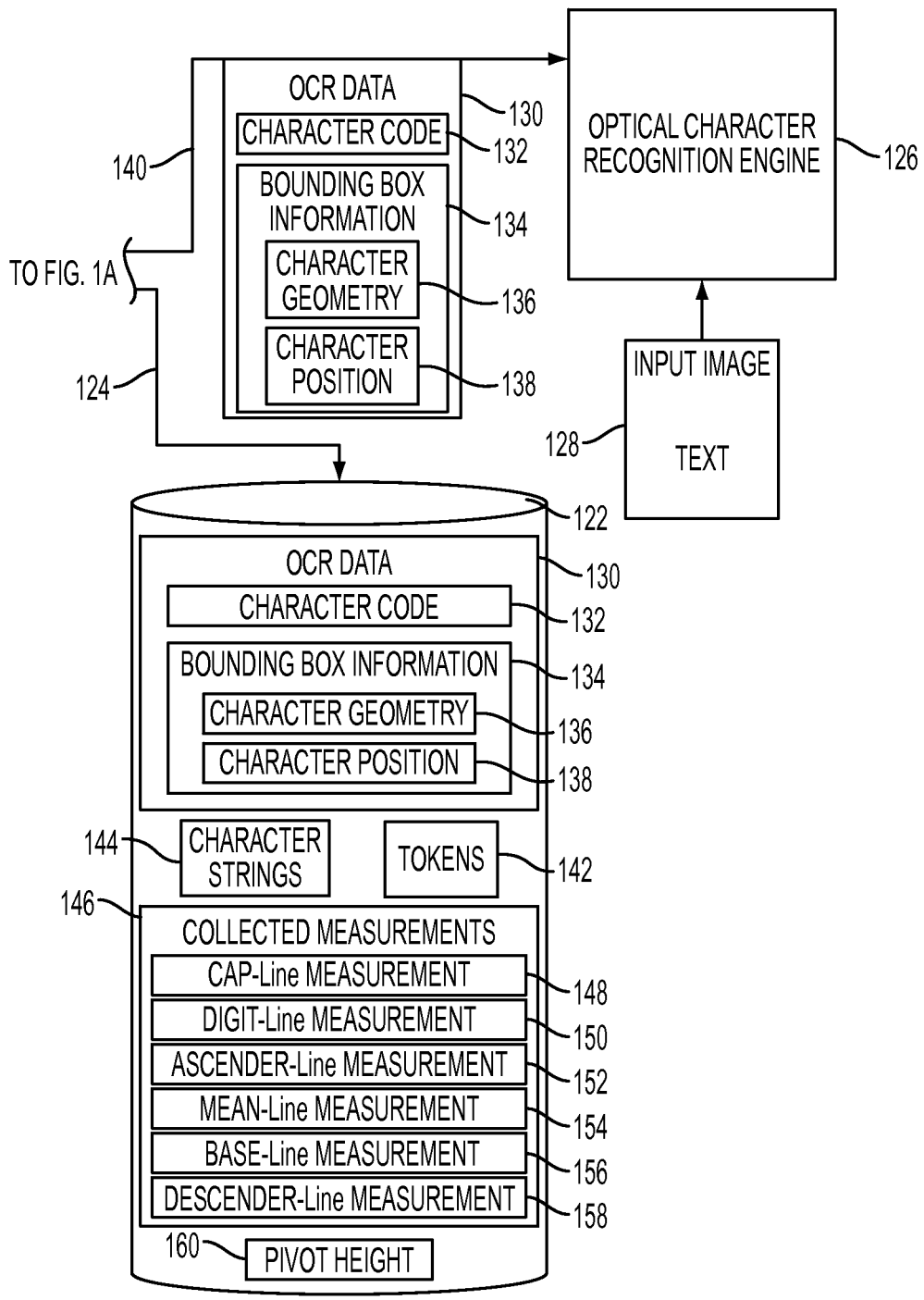

Referring now to FIGS. 1A-1B, there is shown a post-OCR font size determination system 100 capable of determining the font size of characters recognized from an image of a document in accordance with one aspect of the exemplary embodiment. It will be appreciated that the various components depicted in FIGS. 1A-1B are for purposes of illustrating aspects of the subject application, and that other similar components, implemented via hardware, software, or a combination thereof, are capable of being substituted therein.

The location system 100 is capable of implementation using a distributed computing environment, such as a computer network, which is representative of any distributed communications system capable of enabling the exchange of data between two or more electronic devices. Such a computer network may include, for example, a virtual local area network, a wide area network, a personal area network, a local area network, the Internet, an intranet, or any suitable combination thereof. While depicted in FIGS. 1A-1B as a networked set of components, the system and method are capable of implementation on a stand-alone device adapted to perform the methods described herein.

As shown in FIGS. 1A-1B, the system 100 includes a computer system 102, which is capable of implementing the exemplary method described below. The computer system 102 may include a computer server, workstation, personal computer, combination thereof, or any other computing device.

According to one example embodiment, the computer system 102 includes hardware, software, and/or any suitable combination thereof, configured to interact with an associated user, a networked device, networked storage, remote devices, or the like. The exemplary computer system 102 includes a processor 104, which performs the exemplary method by execution of processing instructions 106 which are stored in memory 108 connected to the processor 104, as well as controlling the overall operation of the computer system 102. The computer system 102 further includes an aggregator 110, as discussed in greater detail below, which may be implemented via hardware, software, or combination thereof. In another example embodiment, the aggregator 110 may be comprised in the instructions 106 operable by the processor 104 to perform the aggregation discussed below.

Computer system 102 also includes one or more interface devices 112, 114 for communicating with external devices. The I/O interface 112 may communicate with one or more of a display device 116, for displaying information to users, such as OCR-related data, and a user input device 118, such as a keyboard or touch or writable screen, for inputting text, and/ or a cursor control device, such as mouse, trackball, or the like, for communicating user input information and command selections to the processor 104. The various components of the computer system 102 may be all connected by a data/control bus 120. The processor 104 of the computer system 102 is in communication with an associated data storage device 122 via a link 124. A suitable communications link 124 may include, for example, the public switched telephone network, a proprietary communications network, infrared, optical, or any other suitable wired or wireless data transmission communications. The data storage device 122 is capable of implementation on components of the computer system 102, e.g., stored in local memory 108, e.g., on hard drives, virtual drives, or the like, or on remote memory accessible to the computer system 102.

The processor 104 of the computer system 102 is also in communication with an associated optical character recognition (OCR) engine 126 via a wired or wireless link 140. A suitable communications link 140 may include, for example, the public switched telephone network, a proprietary communications network, infrared, optical, or any other suitable wired or wireless data transmission communications. The OCR engine 126 is capable of implementation as standalone component of the system 100, as a component integrated with the computer system 102, or other such implementation. In varying embodiments described herein, the OCR engine 126 is configured to generate OCR output 130 of an input image 128. The OCR output 130 may include, for example, character codes 132 and bounding box information 134, which includes character geometry 136 and character position 138. The collection and analysis of the OCR output 130 is discussed in greater detail below with respect to FIGS. 2-6.

The memory 108 may represent any type of non-transitory computer readable medium such as random access memory (RAM), read only memory (ROM), magnetic disk or tape, optical disk, flash memory, or holographic memory. In one embodiment, the memory 108 comprises a combination of random access memory and read only memory. In some embodiments, the processor 104 and memory 108 may be combined in a single chip. The network interface(s) 112, 114 allow the computer to communicate with other devices via a computer network, and may comprise a modulator/demodulator (MODEM). Memory 108 may store data the processed in the method as well as the instructions for performing the exemplary method.

The digital processor 104 can be variously embodied, such as by a single core processor, a dual core processor (or more generally by a multiple core processor), a digital processor and cooperating math coprocessor, a digital controller, or the like. The digital processor 104, in addition to controlling the operation of the computer 102, executes instructions stored in memory 108 for performing the method outlined in FIGS. 3A-3B.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The associated data storage device 122 corresponds to any mass storage device(s), for example, magnetic storage drives, a hard disk drive, optical storage devices, flash memory devices, or a suitable combination thereof. The data storage device 122 may be implemented as a component of the computer system 102, e.g., resident in memory 108, or the like. According to one embodiment, the associated data storage device 122 stores data corresponding to OCR output 130 of the input document 128 from the OCR engine 126, tokens 142, character strings 144, and measurements 146 related to an analysis of the OCR output 130. The OCR output 130 may include, for example, character codes 132 and bounding box information 134, which may comprise character geometry 136 and character position 138. The OCR output 130 is discussed in greater detail below with respect to FIGS. 2-6. The aggregation by the aggregator 110 into the tokens 142 and character strings 144 is discussed more fully below with respect to FIGS. 2-6. The measurements 146, i.e., the measurements 148-158, are discussed in greater detail below with respect to FIGS. 2-6.

Figure 2:
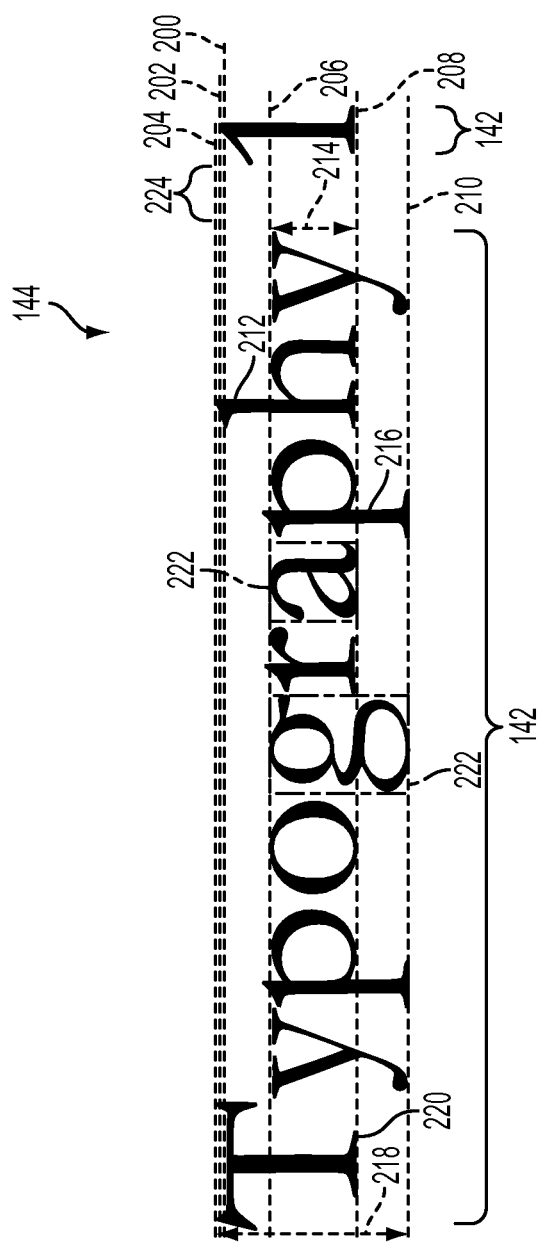
FIG. 2 diagrammatically shows an anatomy of type used in accordance with one embodiment described herein.

FIG. 2 illustrates an example anatomy of type, depicting a character string 144 "TYPOGRAPHY 1", which comprises two tokens 142 (defined in greater detail below), and respective height lines, e.g., the CAP-line 200, the DIGIT-line 202, the ASCENDER-line 204, the MEAN-line 206, the BASE-line 208, and the DESCENDER-line 210. It will be appreciated that FIG. 2 is used hereinafter for purposes of explaining the measurements 146, the determination of the OCR output 130, and the like. Thus, the character string 144 of FIG. 2 may be representative of the input image 128 subject to OCR by the OCR engine 126 from which the aforementioned OCR output 130 is collected.

A "token" 142 may be formed by an accumulation of a sequence of characters. Various methods of token formation may be used. In accordance with some embodiments described herein, a character string 144 represents a series of tokens 142 which may correspond to a full line of text in a document, or a portion of a line in the text. For example, when OCR is performed on text that is both left- and right-justified, large white spaces between words may occur, with these large white-spaces provoking the creation of several character strings 144 instead of a single true line, with each character string 144 including one or more tokens 142.

As set forth in the Basic Anatomy of Type, CAP-line 200, the DIGIT-line 202, the ASCENDER-line 204, the MEAN-line 206, the BASE-line 208, and the DESCENDER-line 201 are horizontal, parallel lines that represent different heights of characters in text. (Source: http://www.webdesign.org/web-desiqn-basics/design-principles/type-face-terms-explained.6065.html). The CAP-line 200 indicates the position of the top of capital letters, which is the height ($h_c$) of the capital letter above the BASE-line 208. It will be appreciated that depending upon the type of font, capital letters may be taller, shorter, or the same height above the BASE-line 208 as letters with ascenders (defined below), or digits (defined below). The DIGIT-line 202 indicates the top of numerals (0, 1, 2, 3, 4, 5, 6, 7, 8, 9), which is at a height ($h_d$) above the BASE-line 208. It will also be appreciated that depending upon the type of font, digits may be taller, shorter, or the same height as either capital letters or letters with ascenders.

The ASCENDER-line 204 indicates the vertical position of the top of an ascender 212 (the stroke of a letter that rises above the MEAN-line 206 (defined below)), e.g., letters 'h', 'k', and 'd', which is at a height ($h_a$) above the BASE-line 208. The ASCENDER-line 204, depending upon the type of font, may be taller than, shorter than, or the same height as the CAP-line 200 and/or the DIGIT-line 202, e.g., $h_d \leq h_a \leq h_c$. The MEAN-line 206 indicates the top of the lowercase letters, e.g., the height ($h_m$) of the top of the lowercase letter above the BASE-line 208. The tops of letters of the x-height 214, illustrated in FIG. 2, depending on the selected font, will typically align with the MEAN-line 206, e.g., 'x', 'a', and 's'. The BASE-line 208 is the line from which other lines (200, 202, 204, 206, and 210) are measured and is the line which is at the bottom of characters without descenders 216. The DESCENDER-line 210 is at the bottom of each descender 216 (the stroke of a letter that hangs below the BASE-line 208), e.g., letters 'q', 'g', and 'p', and is a height ($h_{de}$) below the BASE-line 208. The body size 218 is generally the size of the type being used. The body size 218, corresponding to a distance from the ASCENDER-line 204 to the DESCENDER-line 210. The body size 218 may be estimated in accordance with methodologies and systems set forth herein. A serif 220, as illustrated in FIG. 2, is indicative of small strokes and cross-lines in a character at the end of the height lines 200-210.

Computation of the body size 218 may be performed in accordance with observations of the character codes (not shown in FIG. 2) and bounding boxes (representatively illustrated in FIG. 2 at 222), i.e. (x, y) coordinates and (width, height). It will be appreciated that each character output by the OCR engine 126 includes some bounding box 222 corresponding thereto. Determination of the bounding box 222 may be accomplished in accordance the systems and methods set forth in U.S. Pat. No. 5,825,919, to Dan S. Bloomberg et al., entitled TECHNIQUE FOR GENERATING BOUNDING BOXES FOR WORD SPOTTING IN BITMAP IMAGES, the disclosure of which is incorporated herein by reference in its entirety. It should be noted that, depending on the character code, it may be possible to observe some or none of these five vertical measures. As will be appreciated, the OCR output 130 may be noisy, i.e., the characters may not be evenly aligned as shown in FIG. 2. The 'o' and 'a' could differ in height by a few pixels and the BASE-line 208 could be at a different vertical position. The systems and methods described herein are capable of adjusting for such noise, as will be appreciated by the use of the baseline (discussed below) and application of the methodology set forth in FIGS. 2 and 3A-3B.

Figure 3A:
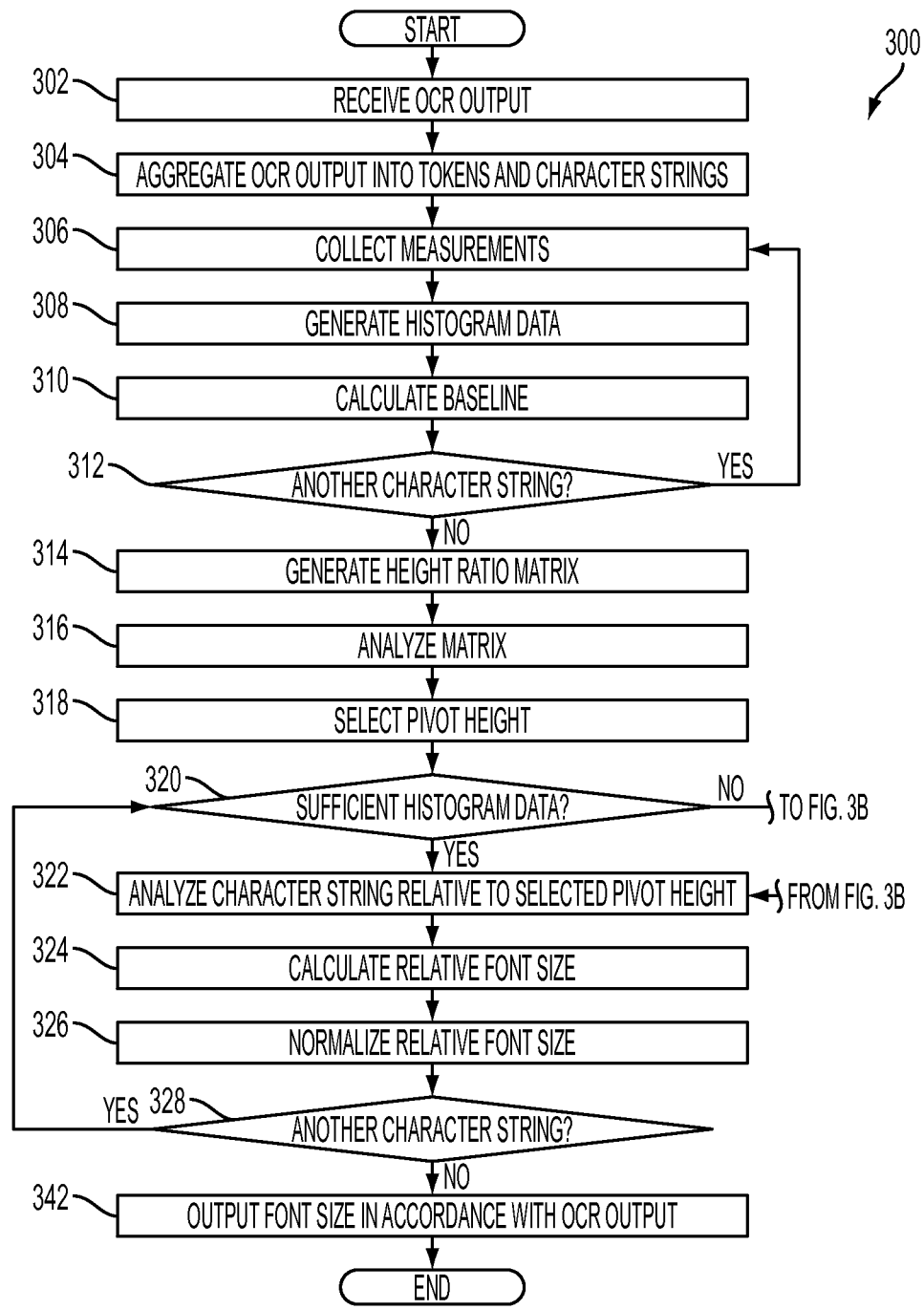
FIGS. 3A-3B depict a flow chart which diagrammatically shows the operation of a method for post optical character recognition determination of font size in accordance with one embodiment.
Figure 3B:
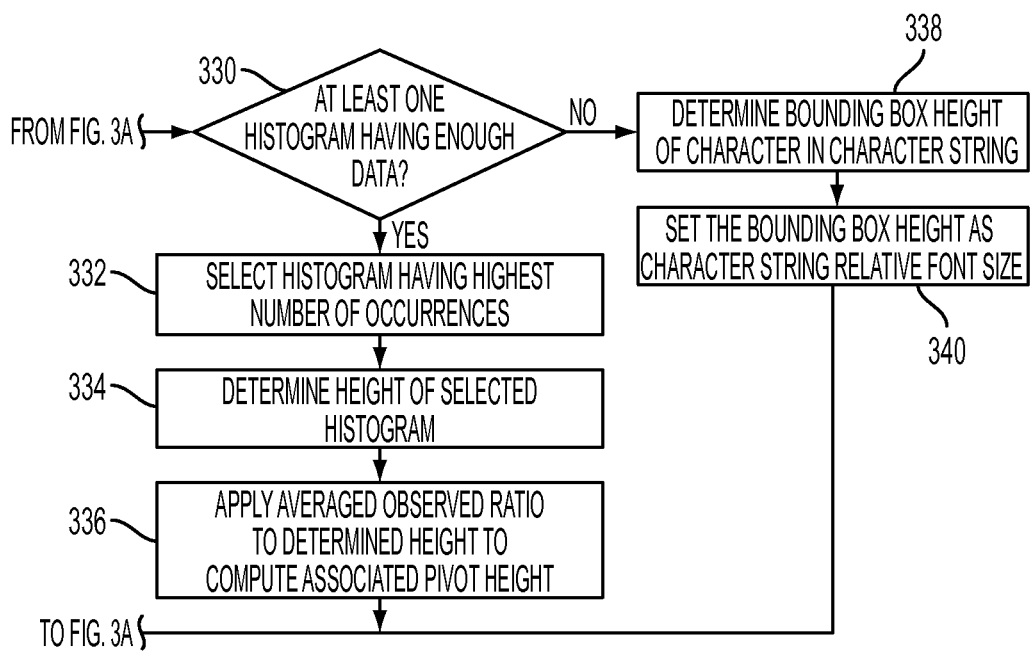

Turning now to FIGS. 2 and 3A-3B, there is shown a flow chart 300 illustrating an exemplary method for post optical character recognition determination of font size in accordance with one embodiment. As will be appreciated, the steps of the method need not all proceed in the order illustrated and fewer, more, or different steps may be performed.

While reference is made herein to the computer system 102, other computer systems are also capable of implementation and use in accordance with the method of FIGS. 3A-3B. Thus, at 302, the processor 104 or other suitable component associated with the computer system 102 receives OCR output 130 from the associated OCR engine 126. The OCR output 130 may include a flow of character codes, each code corresponding to a unique character (Unicode codes) 132, bounding boxes 134, and the like. The bounding boxes 134 may include particular (x, y) coordinates (character positions such as the location of one corner) 136 and/or associated character (width, height) dimensions (character geometries) 138 corresponding to the input image 128. These may be expressed in pixels, metric units, or the like.

For example, output 126 from the OCR engine 122 may include a character that is described in xml as:

```
<zchar l="240" t="301" r="267" b="342" confidence="0.6673293">
  <code>83</code>
</zchar>
```

Where the position of the bounding box 222 is provided by the coordinates l (left), t (top), r (right), and b (bottom), the character code is Unicode 83, and other such information.

After receipt of OCR output at 302, aggregation is then performed by the aggregator 110 of the computer system 102 so as to generate tokens 142 and character strings 144 at 304. In accordance with one embodiment, the token 142 may be formed by aggregating a sequence of characters, with any detected horizontal 'space' 224 above a threshold being indicative of the end of the current token 142, i.e., closes the current token, following which the formation of a new token is begun. Each space 224 may be an actual 'space' character created by the OCR engine 126 or a virtual space, detected as a significantly large horizontal distance/significantly large vertical displacement with the next characters in the OCR output 130. It will be appreciated that various methods of token formation may be used in accordance with one or more embodiments discussed herein.

During the aggregation at 304, lines are formed by aggregating tokens, with a large horizontal or vertical distance between consecutive tokens 142 terminating, or closing, the line currently under construction, i.e., larger than the space between characters and/or tokens. A character string 144 may represent a constructed line which may be a full line of text in a document, or a subset of a line in the text. That is, a subset of tokens 142 in a given line of text in a document may form a character string 144. For example, when OCR is performed on text that is both left- and right-justified, large white spaces between words may occur, with these large white-spaces provoking the creation of several character strings 144 instead of a single true line.

The systems and methods are capable of employing tokens 142, character strings 144, true lines, or a combination thereof. Thus, only for example purposes hereinafter, reference is made to describing operations with respect to character strings 144 which contain tokens 142 and which may or may not be a true line. The aggregation at 304 may occur in accordance with an analysis of horizontal and vertical displacements between the bounding boxes 222 of consecutive characters relative to the dimensions of their respective bounding box 222. For example, when the OCR output 130 includes characters from a top-to-bottom, left-to-right orientation, the following example algorithm may be used to aggregate characters into character strings 144:

```
if ( (cur_l – prev_r) > fTEXT_CUT_RATIO * ((cur_b – cur_t) +
(prev_b – prev_t)) / 2 \
    or (cur_r < prev_l) \
    or (cur_t > prev_b) \
    or (cur_b < prev_t) ):
then current character starts a new character string
```

Where prev_t, prev_b, prev_l, prev_r respectively are the top-, bottom-, left-, and right-values of the previous character bounding box, and cur_t, cur_b, cur_l, and cur_r are top-, bottom-, left-, right-values for the current character bounding box. A method similar to the one implemented in the open source converter pdf2xml is sufficient in several embodiments contemplated herein. [pdf2xml; http://sourceforge.net/projects/pdf2xml/].

At 306, measurements 146 are collected from characters in the received OCR output 130 for a first character string 144. That is, the processor 104 or other suitable component associated with the computer system 102 analyzes a character string 144 or token(s) 142 generated from aggregation by the aggregator 110 at 304. Characters may include, for example and without limitation, letters, numbers, symbols, or the like. In accordance with one embodiment, the measurements 146 are representative of an occurrence of the y-values associated with the bounding box 222 of the character aligning with one of the typographical height lines, i.e., the CAP-line 200, the DIGIT-line 202, the ASCENDER-line 204, the MEAN-line 206, the BASE-line 208, and the DESCENDER-line 210.

For example, and with reference to FIG. 2, the 'T' provides respective measurements 148 and 156 for the CAP-line 200 and the BASE-line 208 in that y-values associated therewith indicate an alignment of the top of the 'T' with the CAP-line 200 and an alignment of the bottom of the 'T' with the BASE-line 208. Similarly, the 'a' provides respective measurements 154 and 156 for the MEAN-line 206 and the BASE-line 208 based upon the y-values associated with the bounding box 222 of the 'a' in FIG. 2. Continuing with the example of FIG. 2, the 'g' provides respective measurements 154 and 158 for the MEAN-line 206 and the DESCENDER-line 210 based upon the y-values associated with the bounding box 222 of the 'g'. The additional letters and digits in 'Typography1' depicted in FIG. 2 also provide similar measurements 146, e.g., the 'h' provides measurements 152 and 154 for the ASCENDER-line 204 and the BASE-line 208, respectively, each 'y' provides respective measurements 158 and 154 for the MEAN-line 206 and the DESCENDER-line 210, the '1' provides respective measurements 150 and 156 for the DIGIT-line 202 and the BASE-line 208, and the like. Thus, in accordance with the character string 144 comprising the tokens 142 'Typography' and the '1' in FIG. 2, measurements 146 are provided indicating (1) occurrence ('T') for the CAP-line 200, (1) occurrence ('1') for the DIGIT-line 202, (1) occurrence ('h') for the ASCENDER-line 204, (8) occurrences ('y', 'p', 'o', 'g', 'r', 'a', 'p', and 'y') for the MEAN-line 206, (6) occurrences ('T', 'o', 'r', 'a', 'h', and '1') for the BASE-line 208, and (5) occurrences ('y', 'p', 'g', 'p', and 'y') for the DESCENDER-line 210.

It will be appreciated that the characters of the OCR output 130 may contribute anywhere from zero to two occurrences of alignment with the height lines 200-210. That is, certain languages that use Latin-based script include accented letters, which extend above the MEAN-line 206, but below the CAP-line 200, the DIGIT-line 202, and the ASCENDER-line 204, or extend below the BASE-line 208, but not to the DESCENDER-line 210. In such circumstances only one occurrence (accent above or below the character) or no occurrences (accent above and below the character) may be ascertained in accordance with the embodiments described herein.

Histogram data is generated at 308 for the current character string 144 corresponding to the number of occurrences, or measurements 146, collected with respect to the CAP-line 200, the DIGIT-line 202, the ASCENDER-line 204, the MEAN-line 206, the BASE-line 208, and the DESCENDER-line 210. Thus, continuing with the example of FIG. 2, the tokens 142 'Typography 1' will contribute histogram data to the character string 144 for the histograms corresponding to the CAP-line 200, the DIGIT-line 202, the ASCENDER-line 204, the MEAN-line 206, the BASE-line 208, and the DESCENDER-line 210. It will be appreciated that other tokens (words, phrases, text-strings, numeric-strings, etc.) may be in the same character string 144, each of which may further contribute to the number of occurrences for each of the CAP-line 200, the DIGIT-line 202, the ASCENDER-line 204, the MEAN-line 206, the BASE-line 208, and the DESCENDER-line 210, and thereby to the generation of histogram data. Each character string 144 in the document or page associated with the OCR output 130 may have its own histogram corresponding to the data derived from occurrences at the CAP-line 200, the DIGIT-line 202, the ASCENDER-line 204, the MEAN-line 206, the BASE-line 208, and the DESCENDER-line 210.

The DESCENDER-line 210 may vary by a substantial amount across characters in an individual font type and/or across families, e.g., the 'p' may go lower than the 'g', the 'f' may or may not have a descender 216 depending on the font type, and the like. In such an embodiment, the collection of data related to alignments with the DESCENDER-line 210 is ignored, resulting in the analysis of the CAP-line 200, the DIGIT-line 202, the ASCENDER-line 204, the MEAN-line 206, and the BASE-line 208.

In such an example embodiment, a histogram is used for the BASE-line 208 based upon y-coordinates. In contrast, the remaining histograms corresponding to the CAP-line 200, the DIGIT-line 202, the ASCENDER-line 204, and the MEAN-line 206, record the height of the characters rather than the y-coordinate of the corresponding line 200-206. It will therefore be appreciated that the DESCENDER-line 210 may be ignored, such that the character heights indicate the CAP-line 200, the DIGIT-line 202, the ASCENDER-line 204, and the MEAN-line 206 relative to the BASE-line 208. Thus, it will be appreciated that the 'p' illustrated in FIG. 2 may not contribute to the computations of the height of the MEAN-line 206 since the height of the observed bounding box 222 (associated with the 'p') is different than the height of the MEAN-line 206. It will further be appreciated that all histograms generated for the character string 144 may use y-coordinates for height determinations.

In accordance with one embodiment, the following example code illustrates one methodology of how a particular character may contribute measurements 146 (an occurrence) for a particular line, i.e., an occurrence of the y-values associated with the bounding box 222 of the character aligning with one of the typographical height lines 200-210. Thus, the example illustration suitably builds a mapping between a character and a tuple of histograms associated with the collection of measurements 146.

```
classHisto = histogram.Histogram
self.hB = classHisto( ) # Baseline
self.hX = classHisto( ) # X height (h_m)
self.hC = classHisto( ) # Capital height (h_c)
self.hD = classHisto( ) # Digit height (h_d)
self.hA = classHisto( ) # Ascent height (h_a)
#if such heights inapplicable, then
self.hTop = classHisto( ) # Top
self.hBottom = classHisto( ) # Bottom
#For each simple letter (without accent or other modifier), define
measurements to be collected
self.d = { } # tuple ( <histo-baseline>, <histo-height> )
#Digits and capitals (may be used to determine a baseline)
for c in '0123456789': self.d[ord(c)] = (self.hB, self.hD)
for c in 'ABCDEFGHIJKLMNOPRSTUVWXYZ' : self.d[ord(c)] =
(self.hB, self.hC)
for c in 'Q' : self.d[ord(c)] = (None , None ) #Q may go lower than
the baseline
#Some lowercase letters that exhibit useful baseline and height
l1 = 'acemnorsuvwx';
for c in l1 : self.d[ord(c)] = (self.hB, self.hX)
#Those letters having an ascender component or a descender component
l2 = 'bdhkl' ;
for c in l2 : self.d[ord(c)] = (self.hB, self.hA)
l3 = 'gpqy' ;
#In the event that line coordinates are being recorded, the following
letters assist in determining the MEAN-line
for c in l3 : self.d[ord(c)] = (None , None)
# f contributes to the ascender measurements only
l4 = 'f' ;
for c in l4 : self.d[ord(c)] = (None , None)
#"l" and "t" have problematic heights
l5 = 'it' ;
for c in l5 : self.d[ord(c)] = (self.hB, None)
l6 = 'j' ;
for c in l6 : self.d[ord(c)] = (None , None)
#The letter "z" may have a descender
l7 = 'z' ;
for c in l7 : self.d[ord(c)] = (None , None)
```

A baseline (based upon the 'y' of the BASE-line 208 of a character string 144 illustrated in FIG. 2 and referenced above) may be calculated at 310 for the character string 144 in accordance with a determination of the mode for the BASE-line 208 histogram associated with the character string 144. It will be appreciated that the calculation and determination of a baseline may optionally be performed in accordance with varying embodiments discussed herein. Accordingly, various methods are contemplated herein pertaining to the calculations of a suitable baseline for use in page layout analysis, e.g., analyzing the distance between the BASE-lines 208 of two vertically-consecutive lines of text on a page is called the 'leading' and may be used to segment the text in a paragraph. Thus, the baseline may be computed by determining the first mode of the BASE-line 208 histogram, i.e., the first of its most frequent value, ordered by increasing values, of the character string 144. It will be appreciated that a minimal number of occurrences may be enforced, e.g., by having a predetermined threshold. In the event that such information is not available via the BASE-line 208 histogram, the baseline may be placed a certain height down of the bounding box 222 relative to the top of the bounding box 222 of the character string 144. Computation of the corresponding height may then be performed via usage of one of the available histograms, e.g., histograms corresponding to the CAP-line 200, the DIGIT-line 202, the ASCENDER-line 204, the MEAN-line 206, or the like. In accordance with one embodiment, a maximum value among the list of first modes associated with each corresponding histogram if available, may be used. Alternatively, the baseline may be determined by placing the baseline approximately ¾ of the distance down from the top of the bounding box 222 of the character string 144. It will be appreciated that ¾ down corresponds to a determination that the x-height ($h_m$) 214 is approximately one-half of the total font size associated with the character string 144, while ascenders 212 and descenders 216 comprise approximately ¼ of the font size each. It will further be appreciated that while discussed herein using histogram modes, alternatives may also be used including, for example, the average observation after removal of outliers of the histograms, and the like.

After optional computation of the baseline at 310, operations proceed to 312, whereupon a determination is made whether another character string remains in the document 128 being processed. Upon a positive determination, operations return to the 306, whereupon the processor 104 or other suitable component associated with the computer system 102 begins the process of collecting measurements 146 for the additional character string in accordance with the methodology set forth above. Upon a negative determination, operations of FIGS. 3A-3B proceed to 314.

At 314, a ratio matrix is generated for use in the determination of a pivot height for use in determining the font size of the OCR output 130. According to one embodiment, the number of CAP-line 200 occurrences for all character string 144 is compared against the number of all ASCENDER-line 204 occurrences to determine a ratio of CAP-line 200 occurrences to ASCENDER-line 204 occurrences. For instance, the word 'Typography 1' of FIG. 2 may help evaluate the ratio between: i) MEAN- and ASCENDER-lines (heights $h_m$ and $h_a$), ii) MEAN- and CAP-lines (height $h_m$ and $h_c$), iii) ASCENDER- and CAPITAL-lines (height $h_a$ and $h_c$).

This is repeated for all sixteen combinations involving the CAP-line 200, the DIGIT-line 202, the ASCENDER-line 204, and the MEAN-line 206, with the resultant ratios placed in a 4×4 matrix with a 1.0 diagonal. Generation of the ratio matrix at 314 may be better understood in conjunction with the following example, using the following character strings:

| |
|---|
| String1 = "xaC2 " |
| String2 = "zn 3 " |
| String3 = " T k" |
| String4 = "sw f" |

String1 allows for the computation of 2 values for the ratio of x-height ($h_m$) to CAP-height ($h_c$) (measured 2 MEAN-line 206 alignment occurrences, e.g., 'x' and 'a', and 1 CAP-line 200 alignment occurrence, e.g., 'C'), 2 values for the ratio of x-height ($h_m$) to DIGIT-height ($h_d$) (measured 2 MEAN-line 206 alignment occurrences, e.g., 'x' and 'a', and 1 DIGIT-line 202 alignment occurrence, e.g., '2'), 1 value for the ratio of CAP-height ($h_c$) to DIGIT-height ($h_d$) (measured 1 CAP-line 200 alignment occurrence, e.g., 'C', and 1 DIGIT-line 202 alignment occurrence, e.g., '2'). The inverse is also computed, i.e., 1 value for the ratio of DIGIT-height ($h_d$) to CAP-height ($h_c$), 2 values for the ratio of CAP-height ($h_c$) to x-height ($h_m$), etc.

String2 allows for the computing of 2 values for the ratio of x-height ($h_m$) to DIGIT-height ($h_d$) (measured 2 MEAN-line 206 alignment occurrences, e.g., 'z' and 'n', and 1 DIGIT-line 202 alignment occurrence, e.g., '3'), and 2 values for the ratio of DIGIT-height ($h_d$) to x-height ($h_m$). Similarly, String3 allows for the computing of 1 value, i.e., the ratio of CAP-height ($h_d$) to ASCENDER-height ($h_a$) (measured 1 CAP-line 200 alignment occurrence, e.g., 'T', and 1 ASCENDER-line 204 alignment occurrence, e.g., 'k'), and the inverse (1 value for the ratio of ASCENDER-height ($h_a$) to CAP-height ($h_c$), etc.). String4 allows for the computation of 2 values for the ratio of x-height to ASCENDER-height ($h_a$) (measured 2 MEAN-line 206 alignment occurrences, e.g., 's' and 'w', and 1 ASCENDER-line 204 alignment occurrence, e.g., 'f'), and the inverse. Thus, for each height ($h_a$, $h_c$, $h_d$, and $h_m$) to height ($h_a$, $h_c$, $h_d$, and $h_m$), a list of observed ratios over all character strings 144 is computed, wherein each cell in the generated matrix is a list, the diagonal being ignored. Another example of such a matrix is illustrated with respect to FIGS. 4-5 and Tables 2-3, as discussed in greater detail below.

The matrix is then analyzed at 316 so as to identify the line (the CAP-line 200, the DIGIT-line 202, the ASCENDER-line 204, or the MEAN-line 206) that has the highest number of occurrences versus the other height lines 200-206. This typography line (the CAP-line 200, the DIGIT-line 202, the ASCENDER-line 204, or the MEAN-line 206) is then selected as the pivot height 160 at 318. According to one embodiment, selection of the pivot height 160 is made based upon the frequency of alignments characters have with one of the four upper lines, i.e., the CAP-line 200, the DIGIT-line 202, the ASCENDER-line 204, and the MEAN-line 206. In accordance with one embodiment, this selection of the pivot height 160 is based upon the collected measurements 146 from all character strings 144.

Continuing with the example four strings set forth above, selection of the pivot height 160 may be made in accordance with two criteria, the number of lists that were computed for that height ($h_a$, $h_c$, $h_d$, and $h_m$), and the total number of observations (measurements 146) for that particular height ($h_a$, $h_c$, $h_d$, and $h_m$). Thereafter, the number of non-empty lists is counted (providing value 1) and the sum of the length of the list is added, which is then divided by a preselected number, e.g., 100, 10000, 100000, or the like (providing value 2). The two values (1 and 2) are then summed to determine a score associated with each height ($h_a$, $h_c$, $h_d$, and $h_m$). The height ($h_a$, $h_c$, $h_d$, and $h_m$) having the highest score may then be selected at 318 as the pivot height 160. Thus, for the example above, the x-height is selected based on a score of 3.00008 (value 1 (3 lists x-height (hm) to CAP-, DIGIT-, ASCENDER-heights ($h_c$, $h_d$, and $h_a$)) plus value 2 (2+2+2+2)/100000) versus CAP-height ($h_c$) with a score of 3.00004 (value 1 (3 lists CAP-height ($h_c$) to x-height, DIGIT-, ASCENDER-heights ($h_m$, $h_d$, and $h_a$)) plus value 2 (2+1+1)/100000). An average ratio may then be computed based upon the observed ratio (i.e., the average number of x-height ($h_m$) occurrences to CAP-height ($h_c$) occurrences per character string 144), as illustrated more fully in TABLE 2 below.

According to one embodiment, the pivot height 160 may be used to calculate the same measure for all character strings 144 so as to generate comparable font size among character strings 144 despite the respective contents thereof providing very different evidence, e.g., lowercase v. uppercase texts. It will be appreciated that the acquisition and determination of font size may be subject to appropriate conversion from one height to the other by computing the average ratio, e.g., between the height ($h_c$) of the CAP-Line 200 and the height ($h_m$) of the MEAN-Line 206 on a page or on a document. The scope of computation, e.g., page or document, will determine the scope of comparable results.

It will be appreciated that the embodiments described herein may be implemented in accordance with an assumption that the same or a similar font type is used in the page (or document) as across different font families the aforementioned ratios may vary. Thus, the proportions of the glyphs facilitates in defining the ratios, e.g., CAP-height ($h_c$) to MEAN-height ($h_m$). It with further be appreciated that when analyzing multiple and differently proportioned font families, differentiating among the font families based on different observed proportions may be required. Furthermore, the embodiments discussed herein are capable of selecting the pivot heights based upon other selection criteria, e.g., using a second order criteria involving number of observations, as provided in the example above.

A determination is then made at 320 whether the corresponding histogram of the character string 144 contains enough data points (occurrences) to enable a proper determination of font height for the particular character string 144 being analyzed. That is, a comparison is made of the amount of information contained in the histogram with respect to a preselected threshold amount, e.g., one or more measurements. For example, if the selected pivot height 160 corresponds to the height ($h_c$) of the CAP-line 200, and the character string 144 includes all capital letters, then the processor 104 determines that enough data is present in the CAP-line 200 histogram associated with the character string 144 to provide a basis for calculating the relative font size of the character string 144. That is, the amount of information contained within the histogram associated with the CAP-Line 200 meets or exceeds the preselected threshold amount, such that the CAP-Line 200 histogram may be used as the basis for calculating the relative font size of the character string 144. At 322, a character string, e.g., the character string 144, is then analyzed relative to the selected pivot height 160, i.e., the histogram data that corresponds to the selected pivot height 160 (CAP-, ASCENDER-, MEAN-, DIGIT-, etc. heights). That is, an analysis is performed of the histogram associated with the (e.g., the CAP-Line 200) for the character string 144 that corresponds to the selected pivot height 160 (the CAP-Line 200). A relative font size (height) is then calculated for the character string 144 at 324 by determining the first mode of the corresponding histogram.

Operations then proceed to 326, whereupon the font size of the character string 144 is calculated from the relative font size height of the character string 144 at 324. That is, some character string font size information is calculated at 324, which is then used at 326 to ascertain the font size proper associated with the particular character string 144. For example, if the height ($h_m$) of the MEAN-line 206 was selected at 318 as the pivot height 160, then all relative font sizes computed so far correspond to an evaluation of the height ($h_m$) of the MEAN-line 206, which may not be the font size proper. It will therefore be appreciated that to determine an approximated absolute value of the font size (font size proper), all relative computed font sizes are normalized by an arbitrary factor in accordance with the selected pivot height 160 at 326.

Table 1 provides an example of factors that may be used in accordance with the methodology of FIGS. 3A-3B. It will be appreciated that the factor may be dependent upon the design of the font type and in particular of its chosen proportions. Thus, it will be appreciated that other factors may be selected in accordance with the font type (if known).

TABLE 1

| Pivot height | Example | Factor | Rationale |
| --- | --- | --- | --- |
| Capital | M | 1.33 | 1/0.75 In consideration that a capital character occupies approximately ¾ of the character "space" (called the em) |

TABLE 1-continued

| Pivot height | Example | Factor | Rationale |
| --- | --- | --- | --- |
| Digit | 5 | 1.33 | 1/0.75 In consideration that a capital character occupies approximately ¾ of the character "space" (called the em) |
| Ascender | H | 1.4 | In consideration that that an ascender often goes a bit lower than the capital |
| x | x | 2 | In consideration that that the x-height is half the whole height |

It should be noted that as the same factor will be applied to all font size computed at 326 given the page or document 128, the relative size of the character string 144 is preserved. That is, the impact of a wrong arbitrary factor may result in a wrong absolute font size, but the relative font size of each character string 144 in the document 128 or page being analyzed will remain comparable to each other. A determination is then made at 328 whether another character string remains in the document 128 or page being processed for font size determination. Upon a positive determination, operations return to 320, whereupon a determination is made whether the next character string contains sufficient histogram data corresponding to the selected pivot height 160. A positive determination at 320 results in the analysis of the character string 144 relative to the selected pivot height 160 and the calculation of the relative font size of the next character string 144 in accordance with the discussions set forth above.

When it is determined at 320 that the histogram of the character string 144 corresponding to the selected pivot height 160 does not include sufficient data, i.e., the amount of information within the histogram associated with the pivot height 160 is less than the preselected threshold amount, operations proceed to 330. At 330, a determination is made whether at least one other histogram (corresponding to the non-selected pivot height, e.g., the histogram associated with CAP-line 200, the DIGIT-line 202, the ASCENDER-line 204, the MEAN-line 206, etc.) contains sufficient data. That is, the amount of information in such histograms is compared to the preselected threshold amount to determine whether the histogram is capable of being used in accordance with 332-336, as set forth hereinafter. It will be appreciated that in the event that none of the histograms associated with the height lines 200-208 of the character string 144 include sufficient data, i.e., no measurements, operations proceed to 338, as discussed in greater detail below.

Upon a positive determination at 330, operations progress to 332, whereupon the histogram associated with the character string 144 that includes the largest number of occurrences, which does not correspond to the selected pivot height 160 is then selected. At 334, the corresponding height of the selected height line (e.g., height ($h_c$) of the CAP-line 200, height ($h_d$) of the DIGIT-line 202, height ($h_a$) of the ASCENDER-line 204, height ($h_m$) of the MEAN-line 206, etc.) is then determined by analyzing the corresponding histogram and determining the first mode thereof. An averaged observed ratio is then applied to compute the chosen pivot height 160, relative to the height of the selected line (e.g., CAP-line 200, DIGIT-line 202, ASCENDER-line 204, MEAN-line 206, etc.) at 336. Operations then proceed to 322 and the character string 144 is analyzed relative to the selected pivot height 160. Thereafter, the relative font size associated with the character string 144 is calculated at 324 and normalized at 326, following which operations proceed as discussed above with respect to FIGS. 3A-3B.

Returning to 330, upon a determination that none of the histograms associated with the character string 144 contain sufficient data, i.e., the amount of information in each histogram is less than the preselected threshold amount, operations proceed to 338. At 338, a height associated with a bounding box 222 of at least one character in the character string 144 is selected. This bounding box height is then set as the relative font size of the character string 144 at 340. Following such a designation, operations proceed to 322, whereupon the character string 144 is analyzed relative to the selected pivot height 160 (i.e., the bounding box height), and the relative font size of the character string 144 is calculated at 324. Thereafter, operations return to 326, whereupon this relative font size is normalized in accordance with the arbitrary factor associated with the original selected pivot height 160. A determination is then made at 328 whether any additional character string 144 remain for processing. Upon a positive determination, operations return to 320 for a determination of whether there is sufficient histogram data for the next character string 144 with respect to the selected pivot height 160. Operations then proceed as set forth in greater detail above.

Returning to 328, when it is determined that no additional character strings remain for processing for the document or page 128 being processed, operations progress to 342. At 342, the font size determined at 326 for each character string 144 in the document or page 128 being processed is output in conjunction with the OCR output 130. That is, the OCR output 130 may be communicated to a designated recipient (e.g., storage, user device, display device, or the like) inclusive of the determined font size for each character string 144 contained in the OCR output 130.

It will be appreciated that while illustrated above as implemented with respect to basic Latin characters, several embodiments of the systems and methods set forth above are capable of application to other character sets, e.g., accentuated Latin, Cyrillic, Greek, etc., provided a definition of the evidence brought by each character is available. That is, the Unicode standard provides support allowing the decomposition of a given character in a canonical form, indicating characters modifiers such a cedilla or accent, e.g., the character U+00C7 can be decomposed into LATIN CAPITAL LETTER C WITH CEDILLA. In this way, it is possible to gather measurements 146 from such characters, e.g., 'ç' will contribute to the measurement 154 of the MEAN-line 206 but not the measurement 156 of the BASE-line 208.

Furthermore, other embodiments of the systems and methods set forth above may use lines instead of heights. That is, grounding the method on CAP-Line 200, DIGIT-Line 202, ASCENDER-Line 204, MEAN-line 206, and DESCENDER-Line 210 instead of the heights ($h_c$, $h_d$, $h_a$, $h_m$, and $h_{de}$) corresponding thereto is capable of implementation and enables for the gathering of more measurements 146, e.g., the 'ç' character and more generally all characters whose bottom is not aligned with the BASE-line 208. In such an embodiment, the baseline calculated at 310 may be used to compute the height and in turn the font size. That is, the value of 'y' of the BASE-line 208 is calculated in accordance with the measurements 154, which may then be used as set forth above to compute the various heights instead of the heights ($h_c$, $h_d$, $h_a$, $h_m$, and $h_{de}$) corresponding to the CAP-Line 200, DIGIT-Line 202, ASCENDER-Line 204, MEAN-line 206, and DESCENDER-Line 210.

The method illustrated in FIGS. 3A-3B may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart 300 shown in FIGS. 3A-3B, can be used to implement the exemplary post optical character recognition font size determination method.

EXAMPLES

Without intending to limit the scope of the exemplary embodiment, the following example illustrates the applicability of the system and method.

Referring now to FIG. 4, there is shown an example image 400 containing text 402 that is subjected to optical character recognition by the OCR engine 126 in accordance with the systems and methods described above. Accordingly, FIG. 5 depicts output text data 500 that corresponds to the text 402 of the input image 400. As shown in FIG. 5, the output text data 500 may be aggregated by the aggregating component 110 so as to produces a plurality of character strings 502 and tokens 504. In the embodiment illustrated in FIG. 5, the character strings 502 are depicted as true lines 506 for example purposes only, and it will be appreciated that each true line 506 is capable of containing any number of character strings 502, as explained in greater detail above. As set forth above, the text output 500 is accompanied by additional data (not shown), which is used to determine the font size associated with the original text 402 of the input image 400.

For example, with respect to the output text data 500, the histogram data associated with the first character string 508 "SCENE v. Alexandria. Cleopatra's palace." comprises:

--- x-height util.histogram.Histogram=[26(1) 27(2) 28(8)] max bin = 28(8) / 11 (avgCount=3.7 sdv=3.8)
capital-height util.histogram.Histogram=[39(7) 40(5) 41(4)] max bin = 39(7) / 16 (avgCount=5.3 sdv=1.5)
digit-height util.histogram.Histogram=[ ] max bin = N/A(0) / 0 (avgCount=N/A sdv=N/A)
ascent-height util.histogram.Histogram=[39(2) 40(1)] max bin = 39(2) / 3 (avgCount=1.5 sdv=0.7)

---

The counts associated with the histograms set forth above may be interpreted such that [26(1) 27(2) 28(8)] is one measurement of 26 pixels observed, two measurements of 27 pixels observed, and eight measurements of 28 pixels observed in the x-height histogram of the first character string 508. While the character string 510 has the following associated histogram data:

```
x-height util.histogram.Histogram=[20(3) 21 (2)] max bin =
20(3) / 5 (avgCount=2.5 sdv=0.7)
capital-height util.histogram.Histogram=[28(16) 29(7) 30(5)] max bin =
28(16) / 28 (avgCount=9.3 sdv=5.9)
digit-height util.histogram.Histogram=[ ] max bin = N/A(0) /
0 (avgCount=N/A sdv=N/A)
ascent-height util.histogram.Histogram=[ 30(1) ] max bin =
30(1) / 1 (avgCount=1.0 sdv=0.0)
```

Continued application of the methodology set forth in FIGS. 3A-3B to the input image 400 is not included for purposes of brevity with respect to the remaining character strings 502 in FIG. 5. The above-mentioned ratio matrix corresponding to the input image 400 is set forth below in Table 2:

TABLE 2

| | average ratio | | | |
|---|---|---|---|---|
| | x-height ($h_m$) | capital-height ($h_c$) | digit-height ($h_d$) | ascent-height ($h_a$) |
| x-height | 1 | 0.71 | | 0.68 |
| capital-height | 1.41 | 1 | | 0.97 |
| digit-height | | | 1 | |
| ascent-height | 1.46 | 1.04 | | 1 |

That is, Table 2 illustrates the above-referenced ratio between the four heights of interest (x-height i.e., the height ($h_m$) associated with the MEAN-Line 206), capital height ($h_c$), digit height ($h_d$) and ascent height ($h_a$)), with a diagonal of 1.0 for the observed input image 400. Thus, Table 2 indicates that (from the example 400) there are 1.41 x-height ($h_m$) occurrences for every 1 CAP-line 200 height ($h_c$) occurrence, and 1.46 x-height (hm) occurrences for every 1 ASCENDER-line 204 height ($h_a$) occurrence, as an average across all character strings 502 in the output text data 500. Accordingly, the x-height ($h_m$) is the proper pivot height for all character strings 502. Table 3 illustrates the length of each list, i.e., the number of observed ratios over all character strings (12 x-height ($h_m$) to CAP-height ($h_c$) ratios, 12 CAP-height ($h_c$) to x-height ($h_m$) ratios, etc.):

TABLE 3

| | ratio count | | | |
|---|---|---|---|---|
| | x-height ($h_m$) | capital-height ($h_c$) | digit-height ($h_d$) | ascent-height ($h_a$) |
| x-height | 0 | 12 | 0 | 11 |
| capital-height | 12 | 0 | 0 | 11 |
| digit-height | 0 | 0 | 0 | 0 |
| ascent-height | 11 | 11 | 0 | 0 |

From the histogram data and Tables 2-3, the following observations are made in accordance with the previously set forth systems and methodologies of FIGS. 1-3:

```
Coverage for x-height = 2.000023
Coverage for capital-height = 2.000023
Coverage for digit-height = 0.000000
Coverage for ascent-height = 2.000022.
```

Accordingly, the pivot height 160 may be selected as the x-height (the height ($h_m$) of the MEAN-Line 200), thus:

```
Ratio x-height --> x-height = 1.0
Ratio x-height --> capital-height = 0.70960624343
Ratio x-height --> digit-height = None
Ratio x-height --> ascent-height = 0.684417543241
```

Figure 6:
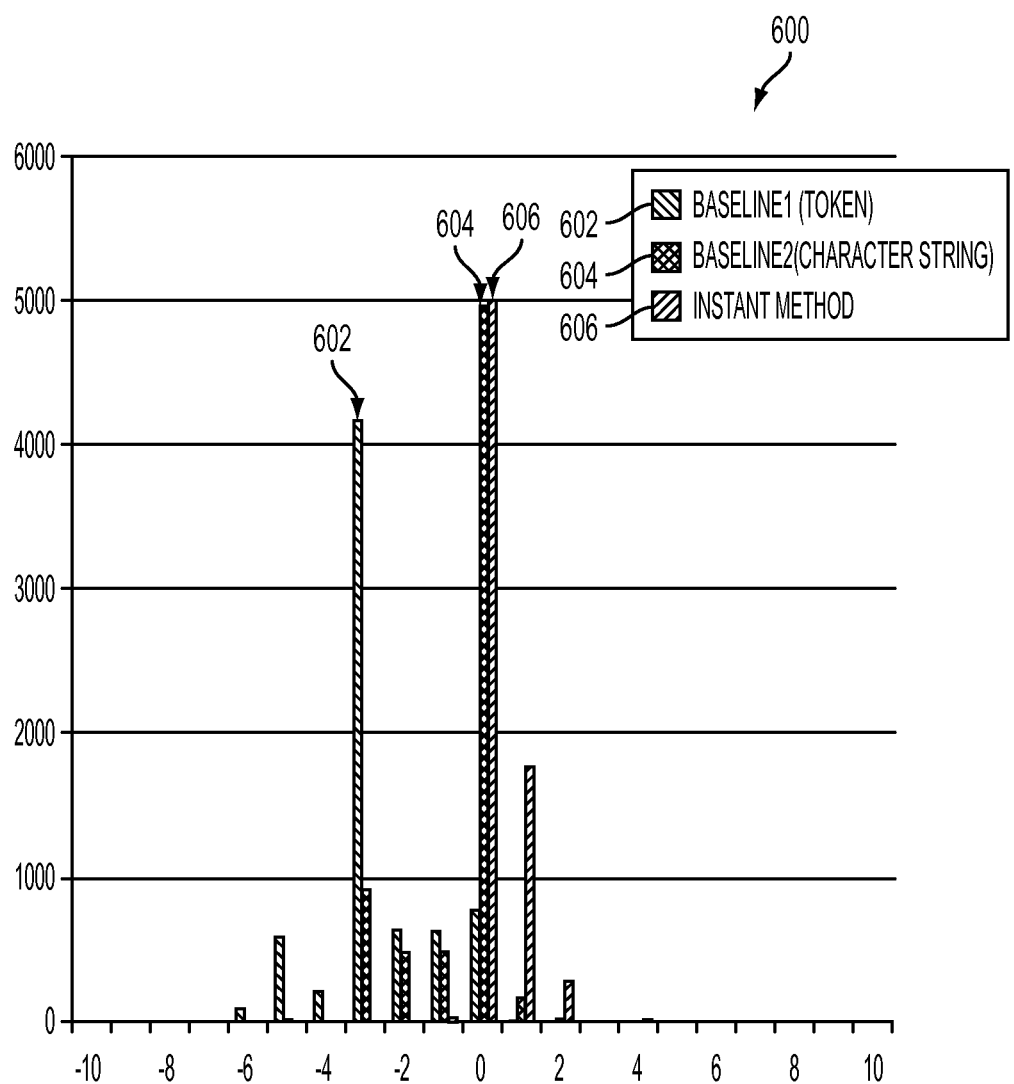
FIG. 6 illustrates a histogram of errors in accordance with one embodiment.

FIG. 6 illustrates experimental results and validations in operations for post-OCR font size determination in application of the methods of FIGS. 3A-3B. It is to be appreciated that the application and comparison to other approaches is intended as an example. In accordance with an example implementation, a test PDF document, e.g., a portable document format from ADOBE, was used containing a variety of font size and font families. For each token of this test PDF document, accurate font size information was extracted using the aforementioned open source PDF to XML converter. This PDF was then suitably converted to 300 dpi images and subjected to optical character recognition via the OCR engine 126, implementing TOCR and NUANCE. Evaluation of these results was then performed, wherein ground truth-words and test-words were aligned by their textual contents and position. The evaluation resulted in the alignment of 80% of the words (9144 total words), leaving 1920 unaligned words due to OCR or aggregation error. As baseline, a method was implemented using the bounding box height as font size, at either character string or token granularity (the character string level being expected to be better).

Table 4 below illustrates the results in term of accuracy (proportion of correct font size ±d, with d=0, 1, 2, 3, 4 and 5) and also shows the repartition of errors. In the example implementation, the table depicts the global accuracy, at various tolerances of error. Also depicted in FIG. 6 is a zoomed histogram of errors 600 in the range [−10, +10], where most errors occur.

TABLE 4

| | Tolerated font size error | | | | | |
|---|---|---|---|---|---|---|
| Method | ±0 | ±1 | ±2 | ±3 | ±4 | ±5 |
| Baseline1 (by token height) | 10.9% | 19.6% | 28.7% | 86.4% | 89.5% | 98.2% |
| Baseline2 (by character string height) | 68.7% | 78.1% | 85.4% | 98.2% | 98.3% | 98.7% |
| Instant method | 69.4% | 94.6% | 98.8% | 99.1% | 99.6% | 99.6% |

It will be appreciated, as evidenced by the experiment referenced above, the use of the bounding-box height of tokens (referenced as the baseline 1 602 in FIG. 6) frequently underestimates the font size, due to tokens without a descender 216 and/or ascender 212 (or capital or digit) in their contained characters. The most frequent error will depend on the most frequent font size used in a document (since descender 216 and/or ascender 212 will be proportional to it). Furthermore, using the bounding-box height of character strings provides an improved font determination (referenced as the baseline 2 604 in FIG. 6), as more characters with ascender 216 or descender 212, or capital or digits may be observed. However, baseline 2 remains limited since some character strings may not have any descender 216 at all for instance. Thus, application of the methodology 606 set forth above provides additional assistance in font size determination, as illustrated in the comparison with baselines 1 and 2 (602, 604), while remaining computationally efficient.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for post optical character recognition font size determination, comprising:
   with a processor, aggregating optical character recognition output from an associated optical character recognition engine into a plurality of character strings, the optical character recognition output comprising character code information and bounding box information;
   collecting measurements from each of the plurality of character strings, the measurements corresponding to a number of observations of heights associated with each character in each character string, wherein the heights correspond to an alignment of the bounding box of each character in each character string with an ascender-line, a cap-line, a digit-line, a mean-line, a base-line, or a descender-line;
   generating at least one histogram for each character string in accordance with collected measurements for each of the ascender-line, the cap-line, the digit-line, the mean-line, the base-line, and the descender-line;
   selecting a pivot height in accordance with the at least one generated histogram for each of the plurality of character strings, the pivot height corresponding to a height of the ascender-line, the cap-line, the digit-line, the mean-line, the base-line, or the descender-line;
   determining a height for each character string of the plurality thereof in accordance with the selected pivot height;
   for each of the plurality of character strings, normalizing the determined height by a preselected factor associated with the selected pivot height; and
   determining a font size for the optical character recognition output based in accordance with the normalized height.

2. The method of claim 1, further comprising outputting the determined font size in association with the optical character recognition output.

3. The method of claim 1, wherein aggregating the optical character recognition output further comprises:
   analyzing horizontal and vertical displacement between bounding boxes of consecutive characters in the optical character recognition output relative to the dimensions of respective bounding boxes; and
   forming the plurality of character strings in accordance with an output of the analysis.

4. The method of claim 3, wherein the intersect of the bounding box of each character in the character string corresponds to a y-coordinate of a top and a bottom of each character, wherein the y-coordinate denotes an alignment of the top or bottom with the ascender-line, a cap-line, a digit-line, a mean-line, a base-line, or a descender-line.

5. The method of claim 3, wherein selecting the pivot height further comprises:
   determining a frequency of occurrences associated with the ascender-line, the cap-line, the digit-line and the mean-line for each of the plurality of character strings;
   generating a matrix of ratios between the determined frequency of occurrences for each of the ascender-line, cap-line, digit-line, and mean-line occurrences; and
   selecting, as the pivot height, a most frequent height in accordance with a ratio between the frequency occurrences of heights.

6. The method of claim 5, further comprising:
   analyzing at least one character string relative to the selected pivot height; and
   determining an amount of information contained in the histogram corresponding to the selected pivot height in the at least one character string relative to a preselected threshold amount.

7. The method of claim 6, wherein the determined amount of information meets or exceeds the preselected threshold amount, further comprising determining a first mode of the histogram, wherein the font size of the at least one character string is determined in accordance with the first mode thereof.

8. The method of claim 6, further comprising:
   determining an amount of information in the histogram below the preselected threshold corresponding to the selected pivot height in the at least one of the plurality of character strings;
   selecting at least one additional histogram associated with the at least one character string having a highest frequency of occurrences;
   determining a height associated with the selected at least one additional histogram; and
   applying an averaged observed ratio to the determined height of the at least one additional histogram so as to determine the selected pivot height.

9. The method of claim 6, further comprising:
   determining an amount of information below the preselected threshold in each of the histograms corresponding to the at least one of the plurality of character strings; and
   determining a bounding box height of the at least one character string, wherein the height of the at least one character string is determined in accordance with the bounding box height thereof.

10. The method of claim 9, wherein the bounding box information further comprises character geometry and character position associated with each character in the optical character recognition output.

11. The method of claim 1, wherein the optical character recognition output comprises, for each character, an associated Unicode character code, a position on an input image, and a bounding box.

12. A post optical character recognition font size determination system, comprising:
   a processor with access to associated memory, the associated memory storing:
      optical character recognition output from an associated optical character recognition engine, the optical character recognition output comprising character code and bounding box information;
   an aggregator with access to the associated memory that aggregates the optical character recognition output into a plurality of character strings; and
   memory in communication with the processor, which stores instructions which are executed by the processor for:
      collecting measurements from each of the plurality of character strings, the measurements corresponding to a number of observations of heights associated with each character in each character string, wherein the heights correspond to an alignment of the bounding box of each character in each character string with an ascender-line, a cap-line, a digit-line, a mean-line, a base-line, or a descender-line, generating histograms for each character string in accordance with collected measurements for each of the ascender-line, the cap-line, the digit-line, the mean-line, the base-line, and the descender-line, selecting a pivot height in accordance with at least one generated histogram for each of the plurality of character strings, the pivot height corresponding to a height of the ascender-line, the cap-line, the digit-line, the mean-line, the base-line, or the descender-line, determining a height for each character string of the plurality thereof in accordance with the selected pivot height, normalizing the determined height of each of the plurality of character strings by a preselected factor associated with the selected pivot height, and determining a font size for the optical character recognition output based upon with the normalized height.

13. The system of claim 12, wherein the memory further includes instructions which are executed by the processor for:
determining a frequency of occurrences associated with the ascender-line, the cap-line, the digit-line and the mean-line for each of the plurality of character strings;
generating a matrix of ratios between the determined frequency of occurrences for each of the ascender-line, cap-line, digit-line, and mean-line occurrences; and
selecting, as the pivot height, a most frequent height in accordance with a ratio between the frequency occurrences of heights.

14. The system of claim 13, wherein the memory further includes instructions which are executed by the processor for:
analyzing at least one character string relative to the selected pivot height; and
determining an amount of information contained in the histogram corresponding to the selected pivot height in the at least one character string relative to a preselected threshold amount.

15. The system of claim 14, wherein the determined amount of information meets or exceeds the preselected threshold amount, wherein the memory further includes instructions which are executed by the processor for determining a first mode of the histogram, wherein the font size of the at least one character string is determined in accordance with the first mode thereof.

16. The system of claim 14, wherein the memory further includes instructions which are executed by the processor for:
determining an amount of information in the histogram below the preselected threshold corresponding to the selected pivot height in the at least one of the plurality of character strings;
selecting at least one additional histogram associated with the at least one character string having a highest frequency of occurrences;
determining a height associated with the selected at least one additional histogram; and
applying an averaged observed ratio to the determined height of the at least one additional histogram so as to determine the selected pivot height.

17. The system of claim 14, wherein the memory further includes instructions which are executed by the processor for:
determining an amount of information below the preselected threshold in each of the histograms corresponding to the at least one of the plurality of character strings; and
determining a bounding box height of the at least one character string, wherein the height of the at least one character string is determined in accordance with the bounding box height thereof.

18. A method for post optical character recognition font size determination, comprising:
receiving into associated memory optical character recognition output from an associated optical character recognition engine, the optical character recognition output comprising a character code and a bounding box corresponding to each character in an input image;
with a processor in communication with the associated memory, analyzing a horizontal and a vertical displacement between the bounding boxes of consecutive characters relative to at least one dimension of each respective bounding box;
forming a plurality of character strings from the received optical character recognition output in accordance with the bounding box analysis;
collecting measurements from each of the plurality of character strings, the measurements corresponding to a number of observations of heights associated with each character in each character string, wherein the heights correspond to an alignment of the bounding box of each character with at least one of an ascender-line, a cap-line, a digit-line, a mean-line, a base-line, or a descender-line;
generating a histogram for each of the ascender-line, the cap-line, the digit-line, the mean-line, the base-line, and the descender-line for each of the plurality of character strings in accordance with the collected measurements;
selecting a pivot height in accordance with the at least one generated histogram for each of the plurality of character strings, the pivot height corresponding to a height of the ascender-line, the cap-line, the digit-line, the mean-line, the base-line, or the descender-line;
determining a height for each character string of the plurality thereof in accordance with the selected pivot height;
normalizing the determined height by a preselected factor associated with the selected pivot height for each of the plurality of character strings; and
outputting a font size associated with each of the plurality of character strings based in part upon the normalized height in association with the received optical character recognition output.

19. The method of claim 18, wherein selecting the pivot height further comprises:
determining a frequency of occurrences associated with the ascender-line, the cap-line, the digit-line and the mean-line for each of the plurality of character strings;
generating a matrix of ratios between the determined frequency of occurrences for each of the ascender-line, cap-line, digit-line, and mean-line occurrences; and
selecting, as the pivot height, a most frequent height in accordance with a ratio between the frequency occurrences of heights.

* * * * *